Dec. 14, 1954    T. J. LEHANE ET AL    2,696,715
AUTOMATIC VENTILATING AND COOLING SYSTEM
Filed Jan. 7, 1953

INVENTORS.
Timothy J. Lehane
Charles Edward Patrick Hall
By Harvey M. Gillespie
Atty.

United States Patent Office 2,696,715
Patented Dec. 14, 1954

2,696,715

AUTOMATIC VENTILATING AND COOLING SYSTEM

Timothy J. Lehane, North Riverside, Ill., and Charles Edward Patrick Hall, Kingsbury, London, England, assignors to Vapor Heating Corporation, Chicago, Ill., a corporation of Delaware Application January 7, 1953, Serial No. 330,034

12 Claims. (Cl. 62—6)

This invention relates to improvements in automatic systems for ventilating and cooling an enclosed space.

A principal object of the invention is to provide an improved automatic system for delivering a uniform volume of air into an enclosed space, whose temperature is being controlled, so as to maintain maximum ventilation within the enclosure and to simultaneously control an air cooling apparatus and an air by-pass damper associated therewith so that all of the delivered air or only a portion thereof may be directed through the cooling apparatus preliminary to the delivery of said air into the enclosure.

According to the invention, a continuously operable blower is provided for forcing a uniform volume of air into the enclosed space. A heat exchanger adapted to cool the air, is arranged in the flow path of the air and has a predetermined operating efficiency in relation to the total volume of air. Therefore, in order to maintain the enclosure at a substantial uniform temperature, a portion of the air is passed through the cooler and the rest of the air is by-passed around the air cooler and thereafter blended with the cooled air to provide an air stream of a desired temperature for delivery into the enclosure. In the event that the temperature within the enclosure is deflected above or below the control point, the by-pass damper is adjusted to increase or decrease the amount of air forced through the cooler and thereby vary the temperature of the blended air sufficiently to overcome the rise or fall of the temperature within the enclosure.

The operation of the by-pass damper and the activation of the air cooler are controlled by three thermostats all of which are of the mercury column type and are of identical construction, so as to be interchangeable in the system. The thermostats are responsive to the general temperature of the enclosure and are provided with electrical heaters which are adapted to apply auxiliary heat to the thermostats so as to permit simultaneous adjustment of their temperature settings. The electrical heaters are so connected in cooperating circuits that one of the thermostats is set to open its contacts in advance of the others; that all thermostats are adjusted to lower temperature settings upon the activation of the cooling mechanism, and that the heating current is transferred from time to time, from one thermostat to the others so as to insure a predetermined sequence of operation.

Another object of the invention is to provide, in a plurality of thermostatically controlled circuits, electrical heaters connected in parallel relation and associated with the several thermostats and a heater balancing coil, the latter of which is so connected in the circuits as to receive the heating current from the heater of one thermostat, when such thermostat is momentarily closed and thereby avoid disturbing the heating effects of the electrical heater associated with the other thermostats.

Figures 1, 3:
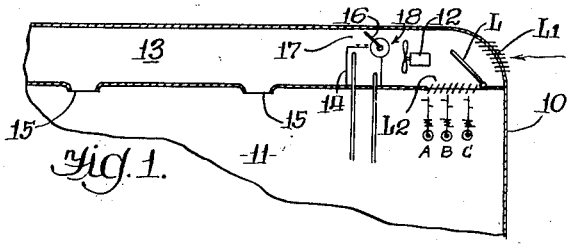
Fig. 1 is a fragmentary sectional view illustrating one embodiment of a structure for delivering a stream of tempered air into an enclosed space and showing also one preferred arrangement of the control thermostats.
Fig. 3 is a chart showing the open and closed positions of the several switch elements of a gang switch shown in Fig. 2 when the gang switch is turned to each of its six positions.
Figure 2:
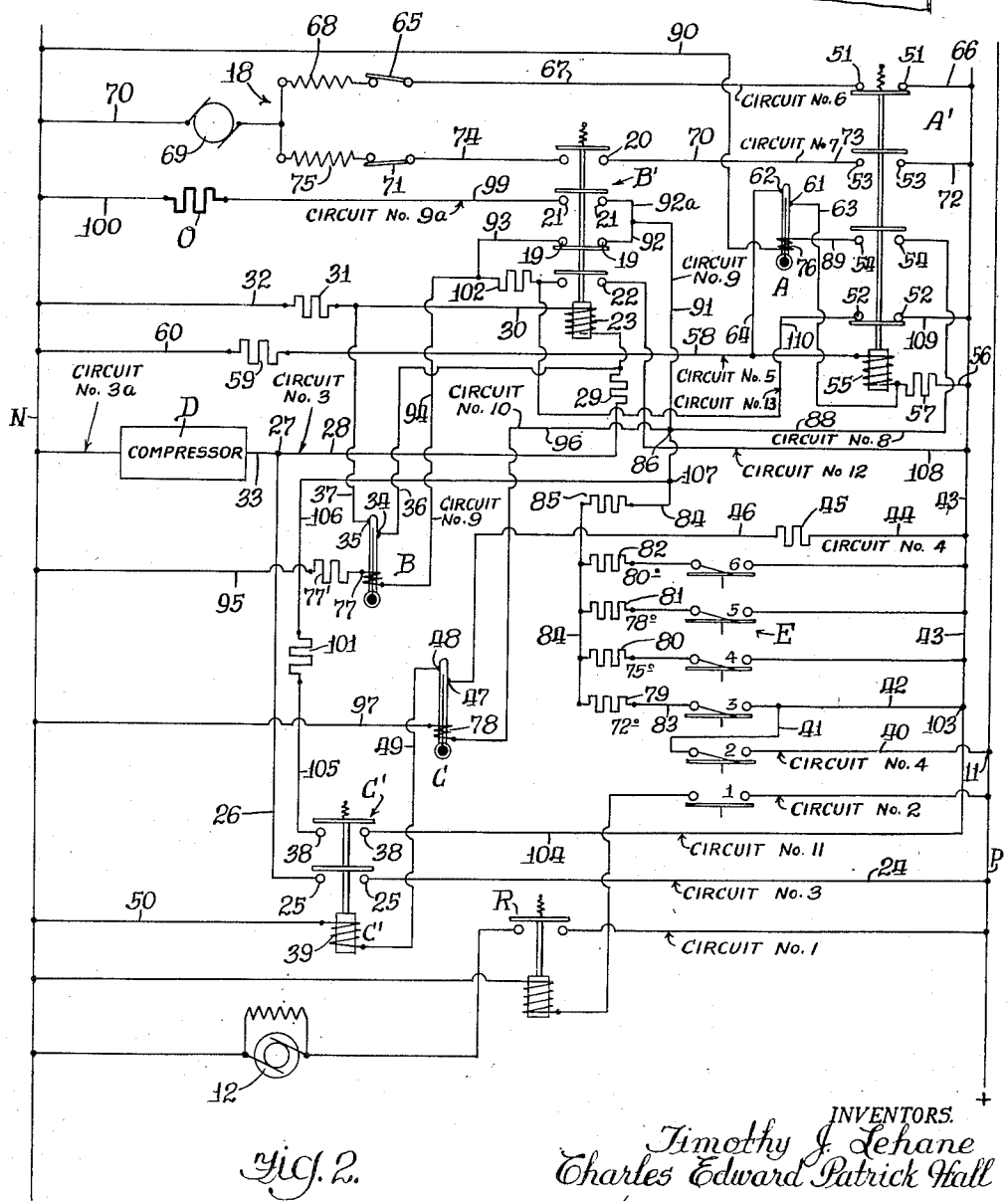
Fig. 2 is a circuit diagram of an electrical system for controlling the operation of the moveable parts of the system.

Referring first to Fig. 1 of the drawing: 10 designates a fragmentary portion of a railway car, the car being used merely as a convenience to define an enclosed space 11. A blower 12 is positioned in an air duct 13 and is operable to force a stream of air through an air cooler 14 and into said enclosed space 11; the air entering the space 11 through delivery ports 15. The blower operates continuously, during the operation of the system to deliver a substantially constant volume of air into the enclosed space 11 so as to insure desirable air circulation. During some temperature conditions of the enclosure 11, the air cooler 14 may remain inactive. In such case the air is circulated through the enclosure for purpose of ventilation.

The blower is energized by a circuit designated circuit No. 1 which is controlled by a relay R energized by a circuit designated No. 2. This circuit is connected through a switch element 1 of a gang switch E composed of switch elements 1 to 6, inclusive, adapted to be closed and opened in the order indicated in the chart shown in Fig. 3. The said chart indicates that the switch E has five positions which represent five stages of operation of the system. The vent position of the switch indicates a stage of operation during which the air cooler is inactive, but switch element 1 is closed to energize relay R and thereby closes circuit No. 1 to energize blower motor 12 so as to create forced air circulation through the enclosure. During this stage of operation, the damper 16 may be in any position. The second stage of operation is designated "cooling 1" in the chart and represents slight cooling of the air. During this stage of operation the switch elements 1, 2 and 3 are closed. The air cooler is activated and the damper 16 may be entirely open or only partially open, depending upon the temperature of the incoming air relative to the temperature settings of the thermostats A, B and C. The third stage of operation designated "cooling 2" represents a condition in which switch elements 1, 2 and 4 are closed and the damper 16 is moved slightly further toward its closed position so as to increase the volume of the air passed through the cooler 14. The fourth stage of operation, designated "cooling 3" represents a condition when switch elements 1, 2 and 5 are closed. It also involves further movement of damper toward its closed position to force a major portion of the air through the air cooler 14. The fifth stage of operation is designated "cooling 4" and represents a condition when switch elements 1, 2 and 6 are closed and the by-pass damper 16 is entirely closed so that all air is passed through the cooler 14 before it is delivered into the space 11. If further cooling is required a recirculation damper L may be positioned to proportionately reduce the volume of outside air entering through louvers L–1 and proportionately increase the amount of cooled air withdrawn from the enclosure through louvers L–2 and recirculated through the cooler 14. In some instances, for example during the presence of a heavy cooling load on the system, all of the air may be passed through the cooler. Under conditions which require less cooling, only a portion of the air is normally directed through the cooler 14 and the rest of the air is by-passed around the cooler and thereafter mixed with the cooled air to provide delivery air of a desired temperature. The volume of air passed through the cooler 14 depends upon the position of the by-pass damper 16, positioned in a by-pass air duct 17.

The damper 16 is operated by a reversible electrical motor 18, or other equivalent electrically controlled means, under the control of a first and second thermostat, designated, respectively, by reference characters A and B and their associated damper closing and damper opening relays designated A' and B'. Both thermostats A and B are positioned to respond to the general temperature within the enclosure 11 to bring about energization of the damper motor 18. The thermostat A and its associated relay A' control the operation of the motor 18 in a direction to move the damper 16 toward its closed position and the thermostat B and its associated relay B' controls the energization of the motor to move the damper 16 toward its fully open position. A third thermostat C, positioned to respond to the temperature of the enclosure 11, and a cooler control relay C′, cooperate to control the operation of a coolant compressor D and thereby control the activation of air cooler 14.

While the thermostat C and its associated relay C′ cooperate to control the activation of the air cooler 14, the effectiveness of the cooler is controlled by the functioning of thermostats A and B to automatically adjust the damper 16 and thereby determine the proportion of cooled and uncooled air in the stream of blended air delivered into the enclosure 11.

The relay B′ which, as above indicated, cooperates with thermostat B and relay C′ to control the opening movement of the by-pass damper 16, includes a pair of normally closed contacts 19 and three pairs of normally open contacts 20, 21, 22, and an actuating solenoid 23. The solenoid 23 is connected in a circuit, herein designated circuit No. 3, which extends from positive line P through lead 24, contacts 25 of relay C′ and lead 26 to a junction 27. At this point one branch of the circuit follows through lead 28, resistor 29, relay solenoid 23, lead 30, resistor 31 and lead 32 to the negative line N. The other branch of this circuit, designated circuit No. 3ª, follows through lead 33 and the compressor mechanism D to the negative line N. The resistors 29 and 31 serve to balance the resistance of the mechanism D and thereby insures an adequate supply of electrical current to both branches of the circuits No. 3 and No. 3ª.

The thermostat B is connected in circuit No. 3 in shunt with the actuating solenoid 23 of the relay B′. In this connection, spaced apart terminal contacts 34, 35 of the thermostat are connected by leads 36—37 into circuit No. 3 at opposite sides of the solenoid 23. It will be seen, therefore, that when the system is made operative by the closing of the switch element 2 of the gang switch E and circuit No. 3 is also made effective by the closing of the normally open contact 25 of relay C′, as will be presently described, the thermostat B is made effective to control the operation of relay B′. For example, when the mercury column of the thermostat B stands below contact 35, while the relay C′ is energized closed, the relay B′ is energized to open its normally closed contacts 19 and to close its pairs of contacts 20, 21 and 22 and when the mercury column engages said terminal contact 35, the shunt circuit is closed through leads 35—37 and thereby de-energizes relay B′ to close its said contact 19 and to open its contact 20, 21 and 22.

The relay C′ comprises two pairs of normally open contacts 25 and 38 and an actuating solenoid 39, the latter of which is energized by a circuit No. 4. The said circuit No. 4 extends from positive line P through lead 40, closed switch element 2 of gang switch E, leads 41 and 42 to a bus conductor 43 and thence through lead 44, resistor 45, leads 46 through terminal contacts 47, 48 of thermostat C, lead 49, solenoid 39 and lead 50 to negative line N. It will be observed, from the above description, that the terminal contacts 47, 48 of thermostat C are connected in series with the actuator 39 of relay C′ and that the thermostat B and its relay B′ are effective only when the thermostat C is closed to energize its relay C′ so as to close the operating circuit No. 3ª for energizing the coolant compressor D.

The thermostat A and its associated relay A′ cooperate to control the operation of motor 18 in a direction to close damper 16. The relay A′ includes two pairs of normally closed contacts 51—52, two pairs of normally open contacts 53—54 and an actuating solenoid 55. The energizing circuit for relay A is designated circuit No. 5 and follows circuit No. 4 from positive line P through lead 40, switch element 2 of gang switch E, leads 41, 42 and bus conductor 43 and thence through lead 56, resistor 57, solenoid 55, lead 58, resistor 59 and lead 60 to negative line N. The thermostat A is provided with spaced apart terminal contacts 61, 62 which are connected in shunt with the relay solenoid 55 by means of leads 63 and 64 connected into said circuit No. 5 at opposite sides of said relay solenoid 55. It will be observed, therefore, that when the system is operative, the closing of contacts 61 and 62 of thermostat A de-energizes the actuator 55 of relay A′ and thereby closes its contacts 51. When said contacts 51 are closed the relay A′ cooperates with closed limit switch 65 of motor 18 to close an energizing circuit, designated circuit No. 6, through the motor in a direction to move the damper 16 toward its closed position. This circuit No. 6 follows circuit No. 4 from positive line P, to bus conductor 43 and then follows lead 66, deenergized closed contacts 51 of relay A′, lead 67, motor limit switch 65, motor field winding 68 and armature 69 and lead 70 to the negative line N. When the thermostat A breaks contact the relay A′ is energized and consequently closes the relay contacts 53. The said contacts 53 cooperate with closed contacts 20 of relay B′ and motor limit switch 71 to close an energizing circuit designated circuit No. 7, through motor 18 to operate it in a direction to open the damper 16. The said circuit No. 7 follows circuit No. 4 through bus conductor 43 to its junction with lead 72 and thence through lead 72, closed relay contacts 53, lead 73, closed contacts 20 of relay B′, lead 74, motor limit switch 71, motor field 75, armature 69 and lead 70 to the negative line N. From the above it will be observed that the operation of the motor 18 in a direction to open damper 16 requires that both thermostats A and B shall be open at their contacts and that both relays A′, B′ shall be energized.

VARIABLE ADJUSTMENT OF THERMOSTATS

The three thermostats A, B and C, as previously indicated, are manufactured to function at the same temperature, for example 84° F. Consequently, the thermostats are interchangeable in the system and, therefore, avoid all possibility of being installed in the wrong location in the circuits. The thermostats are provided, respectively, with separate electrical heaters 76, 77 and 78 for applying auxiliary heat to the thermostats so as to adjust them to temperature settings lower than said 84°. The several heaters are connected in branch energizing circuits in parallel relation to each other, but each heater is connected collectively with the other heaters in series with a plurality of metered resistors 79, 80, 81 and 82. These resistors have different resistance values and are utilized to supply electrical current to the said heaters 76, 77 and 78 to effect the selected initial adjustment desired for the thermostats. The electric current passed through any one of the several resistors is so distributed to the heater circuits of the several thermostats that substantially equal amounts of heat are applied to the heaters 76 and 78 of thermostats A and C but a reduced amount is applied to heater 77 of thermostat B because of the fact that a resistor 77′ is connected in series with the heater 77. Therefore, thermostat B has a higher functional setting than thermostats A and C. For example, when the switch element 3 of the gang switch E is closed, sufficient electric current passes through the resistor 79 to the thermostat heaters 76 and 78 to apply 12° of heat to each of the thermostats A and C, but only approximately 9° of heat is applied to the thermostat B because of the fact that resistor 77′ is connected in circuit No. 9 in series with the thermostat heater 77. Consequently, the initial setting of thermostat B as a result from the current flowing through resistor 79 will be 75° as compared with the functional setting of 72° for thermostats A and C. The energizing circuits for the auxiliary heaters 76, 77 and 78 extend from the positive line P through lead 40, closed switch element 2 of gang switch E, leads 41 and 42 through switch element 3 of said gang switch E, lead 83, resistor 79, through bus conductor 84 and buffer resistor 85 to a junction 86 of three branches leading to the three auxiliary heaters 76, 77 and 78 and a fourth branch leading to a balancing resistor designated O. This resistor has a resistance value equal to the combined resistance of the heater 77 and the resistor 77′ and is connected through the relay B′ so that it will be energized and thereby balance the distribution of heating current to the heaters 76 and 78 of thermostats A and C, when the heater 77 is de-energized, for example during its cycling operation, as will be hereinafter described.

The branch circuit for energizing auxiliary heater 76 of the damper closing thermostat A is designated circuit No. 8 and leads from said junction 86 through leads 88, closed contacts 54 of relay A′, lead 89 through heater 76 of thermostat A and thence through lead 90 to the negative line N. The branch circuit for energizing the heater 77 of damper opening thermostat B is designated No. 9 and extends from said junction 86 through leads 91—92, closed contacts 19 of relay B′, leads 93—94 through heater 77, lead 95 and resistor 77′ to the negative line N. The branch circuit for energizing heater 78 of cooler control thermostat C is designated No. 10 and extends from said junction 85 through lead 96 to heater 78 of thermostat C, and thence through lead 97 to the negative line N. The alternative branch circuit for energizing the balancing resistor O is designated 9a. This circuit follows circuit No. 9 through lead 91 to its junction with lead 92 and then follows lead 92a through contacts 21 of relay B', lead 99, resistor O and lead 100 to the negative line N.

When it is desired to adjust the thermostats A, B and C so as to make the cooling effective only at a higher temperature, the gang switch E is turned to a position whereby switch element 3 is opened and switch elements 1, 2 and 4 are closed, as illustrated in the chart shown in Fig. 3. In this position of the gang switch, the resistor 80, having a greater resistance value than the resistor 79, is connected into the branch circuits Nos. 8, 9, 9a and 10 and thereby reduces the amount of electrical current supplied to the heaters 76, 77 and 78 so as to increase the initial temperature settings of the thermostats A and C to 75° and the temperature setting of thermostat B to approximately 77°. When the gang switch is adjusted to make resistors 81 effective, the heating current for the thermostats is further reduced and the thermostats A and C are adjusted to the temperature of 78° and the thermostat B is adjusted to a temperature of 79°. When the gang switch E is positioned to close switch elements 1, 2 and 6, the resistor 82 is made effective to further limit the delivery of heating current to the auxiliary heaters of the several thermostats and thereby adjust the thermostats A and C to a temperature of 80° and the thermostat B to approximately 81°.

In addition to the heating current supplied through a selected resistor 79, 80, 81 or 82 to effect the initial settings of the thermostats A, B and C, the said thermostats receive further auxiliary heat as a result of the closing of circuit No. 11 through relay C. The thermostats B and C also receive further quantities of heat from time to time as a result of the transfer of heating current from the heater 76 of thermostat A to the heaters 77 and 78 of thermostats B and C when relay A' is de-energized, the closing of heating circuit 12 through resistor 102 by the energization of relay B', and the closing of heating circuit No. 13 during the de-energization of relay A' when relay B' is de-energized. The auxiliary heat thus applied varies from time to time in response to the changes in the operative positions of the relays A and B. The said heating values are also varied by the variation in the rate of the cycling action of the relays A' and B' in response to the rise and fall of the temperature within the enclosure. Therefore, it is impractical to set forth the exact amount of auxiliary heat applied at a given moment. However, in order to indicate the relative values of the auxiliary heat applied, the following chart indicates the maximum heat applied to thermostats A, B and C for each possible position of the relays A', B', C' when any one of the switch elements 3, 4, 5 or 6 of the gang switch E is closed.

Referring again to the circuits Nos. 11, 12 and 13: The circuit No. 11 extends from the junction 103 of leads 42 and 43, through lead 104, closed contacts 38 of relay C', lead 105, lead 106 to a junction 107 in the main lead 84 so that the heating current supplied through said circuit No. 11 will be distributed by the three branch circuits Nos. 8, 9 and 10 to the auxiliary heaters 76, 77 and 78.

The heater circuit No. 12 extends from bus conductor 43 through lead 108, closed contacts 22 of relay B', resistor 102 and thence through circuit No. 9 through heater 77 of thermostat B and resistor 77' to the negative line N. The circuit No. 13 extends from bus conductor 43 through lead 109, de-energized closed contacts 52 of relay A', lead 110 through resistor 102. If the relay B' is energized all of the current will flow from resistor 102 to heater 77 through circuit No. 9. However, if the relay is de-energized, a portion of the said current will follow the path of circuit No. 9 to said heater 77 of thermostat B and another portion will flow to the heater 78 of thermostat C so as to apply additional heat to this thermostat. The flow path of this portion of the electrical current includes the lead 93, de-energized closed contacts 19 of relay B', leads 92 and 91 to junction 86 and thence through lead 96, heater 78 and lead 97 to the negative line N.

OPERATION

Sequence of thermostats

The sequence contemplated by the invention insures that the thermostat C shall take control of the system and thereby activate the coolant compressor D before the thermostats A and B are effective to perform their controlling functions. This result is insured by the fact that the effectiveness of thermostat B and relay B' are dependent upon the closing of circuit No. 3 under the control of thermostat C and its relay C'. Inasmuch as the damper closing thermostat A and the cooling thermostat C have the same initial setting, for example 72°, it is possible for the damper closing thermostat A to function simultaneously or slightly prior to the thermostat C. However, such prior closing of thermostat A will be only momentary, since its closing will shunt the energizing circuit No. 5 around the actuator coil 55 of relay A' and thereby de-energizes the relay to open the heater circuit No. 8. Therefore, the electrical heating current normally delivered to the heater 76 of thermostat A is transferred in predetermined proportions to the heaters 77 and 78 of thermostats B and C, respectively, or to the resistor O and the heater 78, depending upon the instant operative position of relay B'. As a consequence of this transfer of electrical heating current, the thermostat C will be immediately closed and the relay C' energized to close the circuits No. 3 and No. 3a so as to set the cooling mechanism D into operation and to also energize the relay B'. Thereafter the system will function to adjust the damper 16, to a desired position to maintain the space 11 at the required temperature. This is accomplished during the normal functioning of the system by the cycling action of the thermostats A and B and their associated relays A' and B'.

| Position of Relays | | | Switch Element Closed | Max. Heat Applied to Thermostats | | |
|---|---|---|---|---|---|---|
| Relay A' | Relay B' | Relay C' | | A | B | C |
| | | | | Degrees | Degrees | Degrees |
| Energized | Deenergized | Energized | 3 | 13 | 10 | 13 |
| Deenergized | do | do | 3 | 0 | 28 | 30 |
| Do | Energized | do | 3 | 0 | 21 | 24 |
| Energized | do | do | 3 | 13 | 21 | 13 |
| Do | Deenergized | do | 4 | 10 | 8 | 10 |
| Deenergized | do | do | 4 | 0 | 23 | 25 |
| Do | Energized | do | 4 | 0 | 21 | 19 |
| Energized | do | do | 4 | 10 | 21 | 10 |
| Do | Deenergized | do | 5 | 7 | 6 | 7 |
| Deenergized | do | do | 5 | 0 | 18 | 20 |
| Do | Energized | do | 5 | 0 | 21 | 13 |
| Energized | do | do | 5 | 7 | 21 | 7 |
| Do | Deenergized | do | 6 | 5 | 4 | 5 |
| Deenergized | do | do | 6 | 0 | 14 | 16 |
| Do | Energized | do | 6 | 0 | 21 | 10 |
| Energized | do | do | 6 | 5 | 21 | 5 |

*Automatic operation*

For the purpose of illustrating the automatic operation of the system, let it be assumed that the temperature within the space 11 stands at 70° F., the damper 16 is in a partially open position, and that all switch elements 1 to 6 of the gang switch E are open. Under such assumed conditions, the relays A', B', C' and R will be de-energized and all thermostats A, B and C will be open at their contacts. The closing of switch element 1 of the gang switch E completes circuit No. 2 and thereby energizes relay R so as to close the operating circuit No. 1 of the blower 12. The blower 12 supplies a fixed volume of air for ventilation, the air being delivered into the space 11 through the partially open damper 16 and through the deactivated cooler 14.

If the temperature of the space 11 remains at 70° there will be no need for cooling. Consequently, there will be no need for changing the position of the gang switch E. However, for the purpose of further illustration, let it be assumed that the switch E is positioned to close switch elements 1, 2 and 3 so that cooling of the air will begin automatically when the temperature of the space 11 reaches 72°. It will be observed, in this connection, that the closing of switch element 2 results in energizing relay A', thereby opening the relay contacts 51 and 52 and closes the contacts 53 and 54. The opening of said contacts 51 and 52 opens the damper closing circuit No. 6 and also opens the heater circuit No. 13 through resistor 102 leading to heater 77 of thermostat B and leading also through the closed contacts 19 of deenergized relay B' to heater 78 of thermostat C. The closing of said contacts 53 of relay A' partially closes an operating circuit for the motor 18, but this circuit remains open, for the present, at contacts 20 of relay B'. The closing of contacts 54 of relay A' closes the heater circuit No. 8 through the auxiliary heater 76 of thermostat A and thereby adjusts its functional setting to 72° so as to correspond with the functional setting of thermostat C.

Now let it be assumed that the temperature of the enclosed space 11 rises to 72°, the assumed temperature setting of thermostats A and C (the temperature setting of thermostat B being 75 as previously indicated): The functioning of thermostat C closes the energizing circuits for relay C' and thereby closes circuits Nos. 3, 3ᵃ and 11. The circuit 3 serves to energize relay B'; the circuit No. 3ᵃ serves to energize the cooling mechanism; and the circuit No. 11 serves to apply a small amount of heat to the thermostats, particularly thermostat C so as to insure operation of the cooling mechanism for a period of time after the thermostat C is closed. The said energization of relay B' opens its contacts 19 and closes its contacts 20, 21 and 22. By opening of said contacts 19 and the simultaneous closing of contacts 21, the electrical current delivered through circuit No. 9 to produce the initial setting of thermostat B is diverted through circuit No. 9ᵃ to the balancing resistor; thereby removing the equivalent auxiliary heat from thermostat B without affecting the volume of heat applied to the parallel connected heaters of thermostats A and C. The said closing of said contact 20 of relay B' partially closes the damper opening circuit No. 7, but this circuit will not be completely closed until the thermostat A now in the process of cooling opens its contacts and thereby results in re-energizing relay A' to close its contacts 53 to complete the motor circuit No. 7 to open the damper 16. While the said opening of contacts 19 of relay B' removes the initial auxiliary heat from thermostat B, the closing of relay B' contacts 22 directs a larger volume of heating current to the heater 77 and consequently applies sufficient heat to thermostat B to force it into closed position and thereby de-energize relay B'. Simultaneously with the closing of thermostat C and the consequent energization of relay B', the thermostat A, being of the same initial setting as thermostat C, will function to de-energize relay A' and consequently remove the heating current from auxiliary heater 76 and transfer this current to the heater 78 and to the heater 77 or the balancing resistor O, depending upon the position of relay B'. The de-energizing of relay A' also momentarily closes, through relay contact 51, the motor circuit No. 6 for closing damper 16 and also the de-energized relay A' closes its contacts 52 and thereby closes heater circuit 13. If the relay B' is energized, this circuit does not influence the temperature of the thermostat B to any substantial extent, since the resistor 102 has a fixed capacity, however when the relay B' is de-energized the part of the heating current is directed to heater 77 of thermostat B and the other part is directed through the closed contacts 19 of relay B' to the junction 86 and thence to the heater of thermostat C.

After the temperature of the space 11 reaches said 72°, the thermostats A and B and their associated relays will continue to cycle as above indicated. The operation of the cooler lowers the temperature of the air delivered into the space and the temperature will decline at the thermostats.

During the decline in temperature of the space below the assumed setting of 72° the duration of the open cycle of thermostat A increases and correspondingly increases the de-energized period of the damper closing relay to open the damper closing circuit at contacts 51 of said relay. Also, since heating circuit No. 5 through contact 52 of relay A' is less effective, a proportionately less amount of heat is applied to thermostats B and C. As a consequence, the thermostat B remains open for a proportionately longer period of time so as to maintain the damper opening circuit closed for a corresponding period. This change in the rate of cycle of the thermostats A and B results in energizing the motor 18 so as to adjust the damper 16 to a position which will maintain the temperature of the space 11 below 72° and, at the same time, provide a maximum volume of ventilation. If and when the temperature of the enclosure 11 declines below the adjusted temperature setting of thermostat C (71°) its associated relay C' is de-energized to open the circuits Nos. 3 and 3ᵃ and thereby stop the cooling function of the system.

During the open cycle of thermostat B, the electrical energy for effecting the initial setting of the thermostat is diverted by the energization of relay B' to the balancing resistor O and thereby does not affect the adjustment of the thermostats A and C.

For purpose of further illustration, let it be assumed that the temperature of the enclosure, instead of declining in response to the initial activation of the cooler 14, continues to rise notwithstanding the operation of the cooling mechanism. In such case the duration of the closed cycle of thermostat A (de-energized relay A') will be proportionally longer than its open cycle (energized relay A'). As a consequence, the heating circuit No. 5 is made more effective and the heaters 77 and 78 apply more heat to thermostats B and C, whereby the duration of the closed cycle of thermostat B (de-energized relay B') is increased. As a consequence, the motor circuit No. 6 is closed momentarily from time to time to impart step by step closing movements to the damper 16 until the blended air delivered into space 11 is of a proper temperature to maintain the temperature of the enclosure slightly above the adjusted temperature setting (71°) of the thermostat C. If the decline is below the adjusted temperature (71°) of thermostat C, the cooling system is de-activated and no further cooling will take place until the temperature of the space 11 again rises to 72°; whereupon the operation above described will be repeated.

The above operation has been described with respect to a condition whereby the temperature within the enclosed space 11 rises to the temperature for effecting cooling after the system has been set into operation. However, it is possible that the temperature of the enclosure 11 may be above the assumed adjusted setting of the thermostats before the system is set into operation. Therefore, in order to further illustrate the operation of the system, let it be assumed that the temperature of the enclosed space stands at 74° before the switch elements 1, 2 and 3 are closed. In such case, all thermostats would be closed at their contacts and relay A' would be de-energized to close its contacts 51 and therefore energize the motor 18 in a direction to move the damper 16 to its fully closed position. The compressor D will, of course, be operative as a result of the functioning of thermostat C to deliver cooled air into the space 11 and the relay B' will be de-energized because of the closed thermostat B. The cooled air introduced in the space will cool the thermostat A and cause it and its associated relay A' to cycle, but this cycling operation does not affect the position of damper 16 since the limit switch 65 will have been open by the final closing movement of the damper 16. Consequently, the damper will remain closed until the temperature of the enclosed space falls below the adjusted temperature setting (74°) of the thermostat B. At this time the thermostat B and relay B' will start cycling and each time that the contacts 20 of relay B are closed simultaneously with the contacts 53 of relay A' the motor 18 is energized momentarily in a direction to impart a slight opening movement to the damper 16. This condition will continue with proportionately increased opening movements, during the further decline of the temperature until the damper 16 assumes a position whereby the rate of cycling movements of the relay A' and the relay B' are substantially equal and the temperature stands substantially midway between the adjusted temperature of thermostat B and the adjusted temperature of thermostat C. If the temperature continues to decline below the adjusted temperature of thermostat C (71°), the relay C will be de-energized and the cooler will be de-activated until the temperature of the space again rises to 72°.

The operation of the system is substantially the same as above described when the initial setting of the thermostats A and C are raised to 75°, 78° or 80°, by closing the switch elements 4, 5 or 6, respectively, of the gang switch E. The only difference in the results obtained are those incident to the differences in the values of the several resistors when the resistors 80, 81 or 82 of higher values are utilized in connection with the initial temperature settings of the thermostats.

We claim:

1. In an automatic ventilating and cooling system the combination with an air cooler of fixed capacity for delivering cooled air into an enclosure and an adjustable damper for by-passing variable quantities of uncooled air around the air cooler to vary its effectiveness; of means for controlling the adjustment of said damper and the activation of said cooler comprising a damper closing relay for closing an energizing circuit for the damper actuator to impart a closing movement to the damper, a damper opening relay for closing an energizing circuit for the damper actuator to impart an opening movement to the damper, a cooler control relay for closing an energizing circuit to activate the cooler, separate damper closing and opening thermostats and a cooler control thermostat responsive to the temperature of the enclosure for controlling the energization of said damper closing, damper opening and cooler control relays, respectively, electrical heaters for applying auxiliary heat to the thermostats to adjust their functional settings, and energizing circuit means including a plurality of branches for connecting said heaters in parallel relation; one of said branches being connected through a de-energized open contact of the damper closing relay to the heater of the damper closing thermostat, whereby de-energization of the damper closing relay transfers the heating current from one thermostat heater to the heaters of the other thermostat so as to momentarily lower their temperature settings.

2. An automatic ventilating and cooling system as defined in claim 1 characterized in that all thermostats are constructed to close at the same temperature and that a resistor is connected in series with the heater of the damper opening thermostat, so as to reduce the effectiveness of the heater for the damper opening thermostat and thereby raise its temperature setting relative to the cooler control thermostat.

3. An automatic ventilating and cooling system as defined in claim 2 characterized in that the damper closing thermostat is connected in shunt with its associated relay, whereby this thermostat and relay are cycled by recurrent opening and closing of the branch heater circuit and further characterized in that a de-energized closed contact momentarily closes an energizing circuit for the damper actuator to impart closing movement to the damper.

4. An automatic ventilating and cooling system as defined in claim 3 characterized in that the branch heater circuit for effecting the initial adjustment of the damper opening thermostat is connected through a de-energized closed contact of the damper opening relay and further characterized by the provision of a balancing resistor connected through a de-energized closed contact of the said damper opening relay, whereby the heating current cut off from the heater of the damper opening thermostat by the de-energizing of the damper opening thermostat is directed to the balancing resistor without disturbing the adjustments of the other thermostats.

5. An automatic ventilating and cooling system as defined in claim 4 characterized in that the damper opening relay is energized by a circuit connected through the cooler control relay, whereby the damper opening relay is not effective until the cooler control relay is energized.

6. An automatic ventilating and cooling system as defined in claim 5 characterized by the provision of circuit means connected through an energized closed contact of the cooler control relay for delivering additional current to said branch heating circuits, whereby the temperature settings of all thermostats are lowered slightly upon the closing of cooler control relay and thereby maintain the cooler actuated until the temperature of the enclosure declines below the adjusted temperature setting of said cooler control thermostats.

7. An automatic ventilating and cooling system as defined in claim 6 characterized in that circuit means for energizing the damper actuator to impart opening movement to the damper is connected through an energized closed contact of the damper opening relay and further characterized in that the damper opening thermostat is connected in shunt with a solenoid for operating said damper opening relay, whereby opening and closing of the damper opening thermostat produces cycling operation of its associated relay.

8. An automatic ventilating and cooling system as defined in claim 7 characterized in that circuit means for operating the damper actuator in a direction to open the damper is also connected through an energized closed contact of damper closing relay, whereby the damper is opened to deliver more uncooled air only when both of the damper control thermostats are open and their associated relays are energized.

9. An automatic ventilating and cooling system as defined in claim 8 characterized by the provision of circuit means connected through a de-energized closed contact of the damper closing relay to apply a substantial quantity of auxiliary heat on the damper opening thermostat.

10. An automatic ventilating and cooling system as defined in claim 9 characterized in that the branch heating circuit for effecting the initial adjustment of the damper opening thermostat is effective, when the damper opening relay is de-energized to direct a portion of the last mentioned additional heating current to the auxiliary heater for the cooler control thermostat.

11. An automatic ventilating and cooling system as defined in claim 10 characterized by the provision of a circuit means connected through an energized closed contact of the damper opening relay for applying a heavy bias on the damper closing thermostat to momentarily close the same.

12. An automatic ventilating and cooling system as defined in claim 11 characterized by the provision of a plurality of resistors of different values and switch means for selectively connecting the said resistors into the heating circuits of the several thermostats to selectively adjust the initial adjustments of the thermostats.

References Cited in the file of this patent

UNITED STATES PATENTS

| Number | Name | Date |
|--------|------|------|
| 2,091,563 | Palmer | Aug. 31, 1937 |
| 2,204,403 | Crago | June 11, 1940 |
| 2,238,219 | Fineran | Apr. 15, 1941 |
| 2,485,003 | Lehane | Oct. 18, 1949 |